United States Patent
Kim et al.

(10) Patent No.: US 10,436,081 B2
(45) Date of Patent: Oct. 8, 2019

(54) METHOD FOR REDUCING NOISE OF ELECTRIC OIL PUMP FOR VEHICLE

(71) Applicants: HYUNDAI MOTOR COMPANY, Seoul (KR); KIA MOTORS CORP., Seoul (KR)

(72) Inventors: Jong Hyun Kim, Yongin-si (KR); Seung Jae Kang, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 1029 days.

(21) Appl. No.: 14/883,352

(22) Filed: Oct. 14, 2015

(65) Prior Publication Data
US 2016/0369669 A1     Dec. 22, 2016

(30) Foreign Application Priority Data

Jun. 18, 2015    (KR) .................. 10-2015-0086633

(51) Int. Cl.
| | |
|---|---|
| *F01M 1/02* | (2006.01) |
| *B60W 10/06* | (2006.01) |
| *F16H 57/04* | (2010.01) |
| *F01M 1/16* | (2006.01) |

(52) U.S. Cl.
CPC .............. *F01M 1/02* (2013.01); *B60W 10/06* (2013.01); *F16H 57/0435* (2013.01); *F01M 1/16* (2013.01); *F01M 2001/0215* (2013.01); *F01M 2001/0284* (2013.01); *F01M 2250/62* (2013.01); *F16N 2250/08* (2013.01)

(58) Field of Classification Search
CPC .... F01M 1/02; F01M 1/16; F01M 2001/0215; F01M 2001/0284; F01M 2250/62; B60W 10/06; F16H 57/0435; F16N 2250/08

USPC ........................................................ 701/36
See application file for complete search history.

(56) References Cited

U.S. PATENT DOCUMENTS

| | | | | | |
|---|---|---|---|---|---|
| 6,110,072 | A | * | 8/2000 | Harada | ............... F16H 57/0434 477/157 |
| 6,135,919 | A | * | 10/2000 | Shimakura | .......... F16H 57/0434 184/27.2 |
| 7,290,991 | B2 | * | 11/2007 | Staley | .................... F04B 23/06 123/196 R |
| 7,824,160 | B2 | * | 11/2010 | Nakamura | ............ F04C 27/005 417/213 |

(Continued)

FOREIGN PATENT DOCUMENTS

| | | | |
|---|---|---|---|
| JP | 2579194 | B2 * | 2/1997 |
| JP | 2929451 | B2 * | 8/1999 |

(Continued)

OTHER PUBLICATIONS

Korean Office Action issued in Korean Application No. 10-2015-0086633, dated Jun. 10, 2016.

*Primary Examiner* — Tuan C To
(74) *Attorney, Agent, or Firm* — Morgan, Lewis & Bockius LLP

(57) ABSTRACT

A method for reducing noise generated from an electric oil pump (EOP) is reduced while driving a vehicle which has only the EOP without a mechanical oil pump (MOP) limits revolutions per minute (RPM) of the EOP to 70% or less of a maximum RPM during a low noise driving mode and rotates the EOP at the maximum RPM during a high noise driving mode.

7 Claims, 4 Drawing Sheets

(56) References Cited

U.S. PATENT DOCUMENTS

| | | | |
|---|---|---|---|
| 7,942,645 B2 * | 5/2011 | Nakatsuka | F01M 1/02 |
| | | | 123/196 R |
| 8,668,468 B2 * | 3/2014 | Hwang | F16H 61/0025 |
| | | | 417/253 |
| 9,206,792 B2 * | 12/2015 | Wi | F16H 61/0031 |
| 9,228,655 B2 * | 1/2016 | Wakairo | F16H 61/0025 |
| 2006/0222519 A1 * | 10/2006 | Fujita | F04C 14/26 |
| | | | 417/310 |
| 2011/0166727 A1 | 7/2011 | Light et al. | |
| 2011/0194968 A1 * | 8/2011 | Nakagawa | F04C 2/088 |
| | | | 418/166 |
| 2012/0063920 A1 * | 3/2012 | Ikeda | F16H 61/0021 |
| | | | 417/32 |
| 2012/0244012 A1 * | 9/2012 | Kigure | F04B 17/03 |
| | | | 417/32 |
| 2013/0138311 A1 | 5/2013 | Kang et al. | |
| 2013/0149170 A1 * | 6/2013 | Song | F16H 61/0025 |
| | | | 417/32 |
| 2014/0241917 A1 * | 8/2014 | Suzuki | F04C 2/102 |
| | | | 417/410.4 |
| 2015/0025739 A1 * | 1/2015 | Wakairo | F16H 61/0025 |
| | | | 701/36 |
| 2017/0082104 A1 * | 3/2017 | Yamamoto | F04C 14/08 |

FOREIGN PATENT DOCUMENTS

| | | |
|---|---|---|
| JP | 2007-002767 A | 1/2007 |
| JP | 4510992 B2 * | 7/2010 |
| JP | 2011-195102 A | 10/2011 |
| JP | 2012-097813 A | 5/2012 |
| JP | 2013-112337 A | 6/2013 |
| JP | 2013-133832 A | 7/2013 |
| KR | 10-2012-0046698 A | 5/2012 |
| KR | 10-2012-0072995 A | 7/2012 |
| KR | 10-2014-0119551 A | 10/2014 |

* cited by examiner

----- EOP RPM
——— MAGNITUDE OF NOISE

METHOD FOR REDUCING NOISE OF ELECTRIC OIL PUMP FOR VEHICLE

CROSS REFERENCE TO RELATED APPLICATION

The present application claims priority of Korean Patent Application Number 10-2015-0086633 filed on Jun. 18, 2015, the entire content of which application is incorporated herein for all purposes by this reference.

TECHNICAL FIELD

The present disclosure relates to a method for reducing noise of an electric oil pump, and more particularly, to a method for reducing noise of an electric oil pump for suppressing noise generated from a vehicle in which a mechanical oil pump is omitted and the electric oil pump is solely installed.

BACKGROUND

As shown in FIG. 1, a hybrid vehicle according to the related art includes a mechanical oil pump (MOP) 10 which rotates together with an engine 1 and a motor 2, and an electric oil pump (EOP) 20 which is operated by the electric motor. Among these, the MOP 10, which is a main configuration providing oil pressure to a transmission 3, or the like, is interlocked with a rotational shaft of the engine 1 or the motor 2 to be operated.

That is, the hybrid vehicle according to the related art includes a system in which the MOP 10 is operated together to generate the oil pressure while the engine 1 or the motor 2 runs, and the EOP 20 is additionally operated to assist the oil pressure when a flow rate of oil is insufficient.

However, since the MOP 10 is operated by driving force of the engine 1 and the motor 2, it disturbs driving of the vehicle, thus decreasing fuel efficiency. Further, the MOP has become big obstacle in improving fuel efficiency.

Thus, there has been an attempt to improve the fuel efficiency by removing the MOP and forming the oil pressure using only the EOP. However, in order to form the oil pressure by only the EOP, since the oil pressure of the MOP is supplied through only the EOP, there is a need to significantly increase revolutions per minute (RPM) of the EOP. However, since the EOP is separately installed outside the transmission, when the RPM of the EOP increases, noise generated from the EOP is directly delivered to passengers.

In addition, when an oil temperature increases, an oil leak amount increases as viscosity of oil decreases. In order to increase a supply amount of oil for compensating for the increased oil leak amount, the RPM of the EOP should increase.

In addition, high oil pressure is required to smoothly exchange a gear when shifting. In order to realize the high oil pressure, the RPM of the EOP should increase.

A maximum RPM of the EOP used together with the MOP is about 2500 RPM. However, when only the EOP is used, the EOP rotates at a high speed of about 3500 RPM, where passengers may recognize noise.

Noise may increase as the RPM of the EOP increases when using only the EOP.

Therefore, a method of improving riding quality by suppressing noise occurrence of the EOP in a situation in which passengers may recognize noise has been demanded.

A method for controlling an oil pump of a hybrid vehicle has been studied. According to this method, an RPM of an electric oil pump increases by determining a manipulation from an N stage to a D stage, and after a predetermined time lapses, the RPM of the electric oil pump decreases. Noise occurrence is prevented by controlling the RPM of the electric oil pump as described above.

However, the above-mentioned related art relates to the method for controlling the hybrid vehicle according to the related art in which the MOP as well as the EOP are installed, and has a limitation in that it does not disclose a method for controlling RPM of the EOP depending on oil temperature, RPM of the engine, or the like.

SUMMARY

An aspect of the present inventive concept provides a method for reducing noise of an electric oil pump in which an RPM of the electric oil pump decreases when noise generated from a vehicle is small.

According to an exemplary embodiment of the present inventive concept, a method for reducing noise generated from an electric oil pump (EOP) at while driving a vehicle which has the EOP without a mechanical oil pump (MOP) limits revolutions per minute (RPM) of the EOP to 70% or less of a maximum RPM during a low noise driving mode and rotates the EOP at the maximum RPM during a high noise driving mode.

The method may determine the low noise driving mode when an oil temperature is a reference temperature or less.

The method may determine the low noise driving mode when a throttle opening value is a reference opening value or less.

The method may determine the low noise driving mode when a torque input to a transmission is a reference torque or less.

The method may determine the high noise driving mode when the vehicle shifts.

The method may include determining whether or not an oil temperature is a reference temperature or more; determining whether or not a throttle opening value is a reference opening value or more; determining whether or not a torque input to a transmission is a reference torque or more; determining whether or not the vehicle shifts; and determining the high noise driving mode when the vehicle shifts while the oil temperature, the throttle opening value, and the torque input to the transmission are the reference oil temperature, the reference opening value, and the reference torque, respectively or more.

DESCRIPTION OF THE EXEMPLARY EMBODIMENTS

Special terms used in the present specification are used only in order to describe specific exemplary embodiments rather than limiting the present disclosure. Singular forms used herein are intended to include plural forms unless explicitly indicated otherwise. It will be further understood that the terms "comprises" used in this specification, specify stated features, regions, integers, steps, operations, components, and/or parts, but do not preclude the presence or addition of other stated features, regions, integers, steps, operations, components, and/or parts.

Unless indicated otherwise, it is to be understood that all the terms used in the specification including technical and scientific terms has the same meaning as those that are understood by those who skilled in the art. It must be understood that the terms defined by the dictionary are identical with the meanings within the context of the related art, and they should not be ideally or excessively formally defined unless the context clearly dictates otherwise.

Hereinafter, a method for reducing noise of an electric oil pump according to exemplary embodiments of the present inventive concept will be described with reference to the accompanying drawings.

Figure 1:
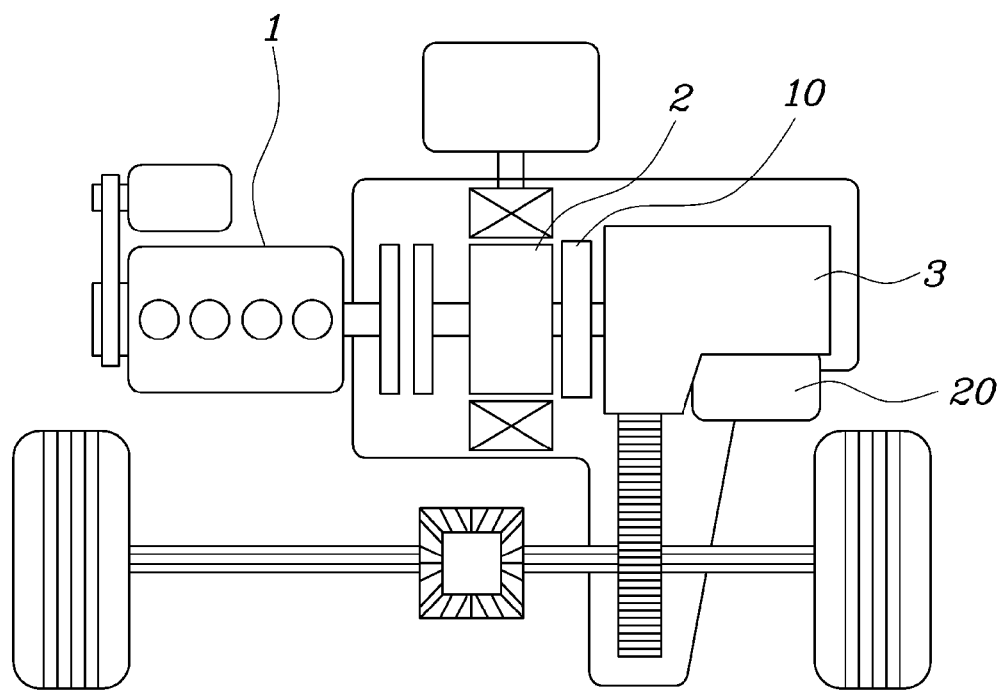
FIG. 1 is a schematic view of a vehicle in which both an MOP and an EOP are installed according to the related art.
Figure 2:
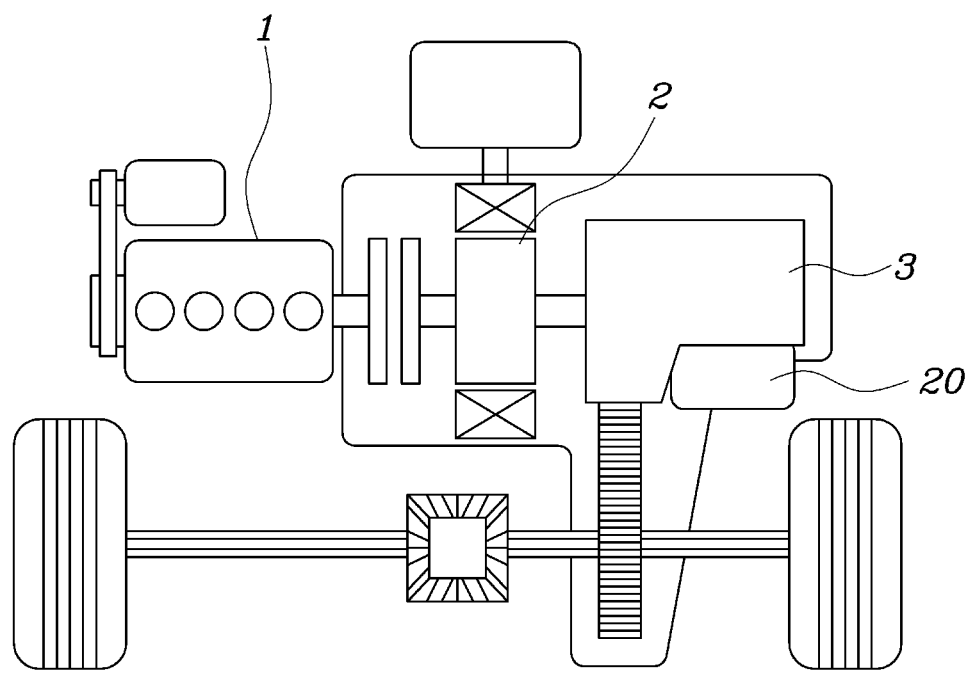
FIG. 2 is a schematic view of a vehicle in which only the EOP is installed according to an exemplary embodiment of the present inventive concept
Figure 3:
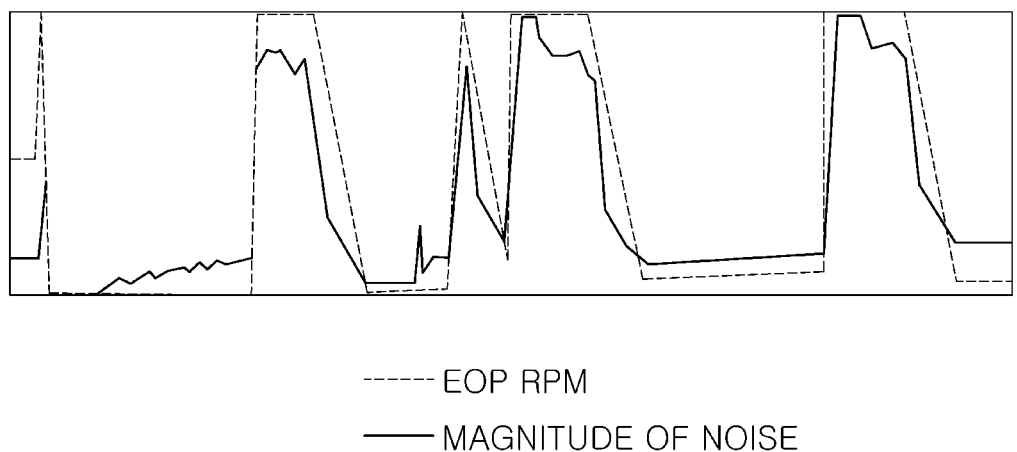
FIG. 3 is a graph comparing how magnitude of noise changes depending on RPM of the EOP.

A physical configuration of the present disclosure will be described with reference to FIG. 2. The present disclosure addresses a vehicle in which a mechanical oil pump (MOP) 10 is omitted and only an electric oil pump (EOP) 20 is mounted. The present disclosure relates to a method for reducing noise generated during a process of operating the EOP, wherein revolutions per minute (RPM) of the EOP is limited to 70% or less of a maximum RPM during a low noise driving mode, and the EOP rotates at the maximum RPM during a high noise driving mode.

Figure 4:
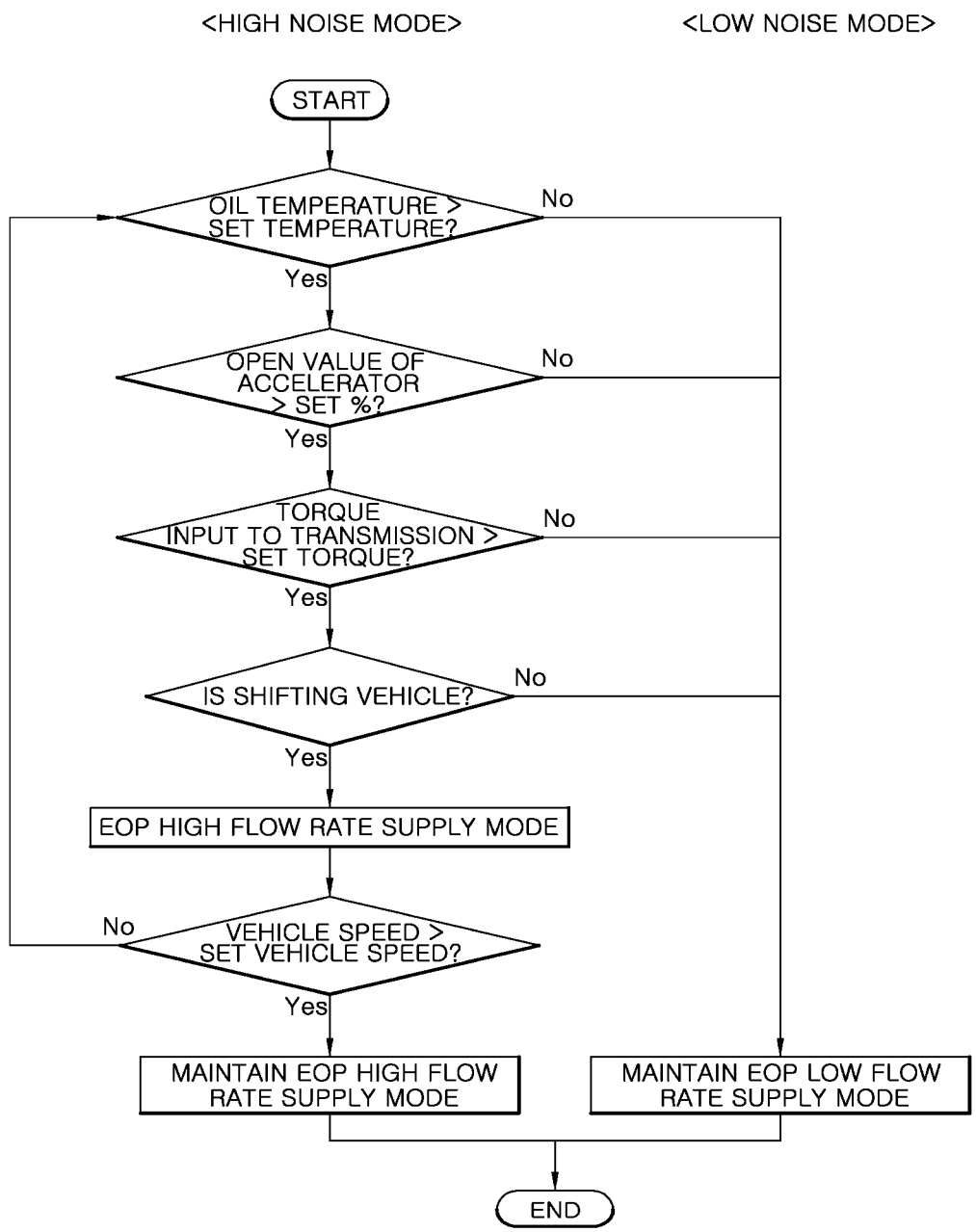
FIG. 4 is a flow chart of an RPM control of the EOP according to an exemplary embodiment of the present inventive concept.

Here, a control logic of RPM of the EOP according to the present disclosure will be described with reference to FIG. 4.

The high noise driving mode is applied to a timing in which noise of the EOP 20 is not recognized by ambient noise such as engine noise, or the like, or the RPM of the EOP needs to necessarily increase due to a requirement of high oil pressure, and the low noise driving mode is applied to other timings.

That is, the high noise driving mode may be applied to a timing in which the high pressure is required, for example, such as at the time of shifting, or when large engine noise is generated due to a high speed driving.

In the high noise driving mode, an RPM of the EOP 20 increases up to 3500 RPM while a pressure of an oil pressure line increases up to 16 bar. However, in the low noise driving mode, the RPM of the EOP 20 is limited to 70% or less of a maximum value, more specifically, 3000 RPM or less, thereby maintaining the pressure of the oil pressure line to 5 to 11 bar.

The above-mentioned classification of the driving mode is performed based on the following references.

1) Oil Temperature: if an oil temperature is higher than a reference temperature, viscosity of oil decreases, thereby causing leakage of oil to be increased. Thus, in order to maintain an appropriate oil pressure, more oil than normal needs to be supplied, and consequently, an RPM of the EOP 20 needs to increase.

In the case in which the oil temperature is the reference temperature or less, since there is no need to increase a supply amount of oil, the RPM of the EOP 20 is maintained to be low, thereby suppressing an occurrence of noise.

Since a change in viscosity is different depending on used oil, it is difficult to set a reference oil temperature to one reference, and the reference oil temperature may be differently set depending on a kind of used oil and optimum viscosity of oil.

2) Throttle Opening Value: if a throttle opening value is higher than a reference opening value, an RPM of an engine 1 increases, thereby increasing noise of the engine 1. When the noise of the engine 1 is high as described above, it is difficult for passengers to recognize the noise generated from the EOP 20. That is, since the noise generated from the engine 1 is larger than the noise generated from the EOP 20, the noise generated from the EOP 20 may not be recognized even though an RPM of the EOP 20 increases.

On the other hand, when a throttle opening value is a reference opening value or less, since an RPM of the engine 1 is not sufficiently high, there is a high probability of recognizing noise generated from the EOP 20. Thus, the RPM of the EOP 20 is maintained to be low, thereby suppressing occurrence of noise.

The reference opening value of the throttle opening value changes depending on a kind of vehicles and the engine 1, or may be based on 30% because the throttle opening value exceeds 30%, the noise generated from the engine 1 generally becomes larger than the noise generated from the EOP 20.

3) Torque Input to Transmission: a torque input to a transmission 3 is higher than a reference torque means that the RPM of the engine 1 is high in proportion to the higher torque. Thus, the noise generated from EOP 20 is not recognized by the noise generated from the engine 1.

On the other hand, when the torque input to the transmission 3 is the reference torque or less, since the RPM of the engine 1 is not sufficiently high and the noise generated from the engine 1 is reduced accordingly, the noise generated from the EOP 20 may be recognized. Thus, in this case, the RPM of the EOP 20 needs to be controlled to be low.

4) Shift: since a high oil pressure is required at the time of shifting the vehicle, the RPM of the EOP 20 needs to increase. As the oil pressure is high, an exchange of a gear becomes more quick and smooth.

In order to determine the high noise driving mode or the low noise driving mode, some of the above-mentioned references may be used, and all references may also be used. However, it may use an operation of determining the driving mode by whether or not the vehicle shifts.

In addition, it may perform a process of maintaining the high noise driving mode until a vehicle speed decreases to a predetermined speed or less after the vehicle enters the high noise driving mode, and again determining the high noise or low noise driving mode when the vehicle speed decreases.

The reason is that since the RPM of the engine 1 is also high when the vehicle speed is fast, recognizable noise does not occur even though the RPM of the EOP increases.

The method for reducing noise of an electric oil pump according to the present disclosure has the following effects.

First, occurrence of noise that the passenger may recognize is prevented, thereby improving driving quality.

Second, an RPM of the EOP is controlled in the low noise driving mode, thereby reducing fuel costs.

Third, fuel costs may be reduced by eliminating the MOP.

Although the exemplary embodiments of the present inventive concept have been described with reference to the accompanying drawings, those skilled in the art will appreciate that various modifications and alterations may be made without departing from the spirit or essential feature of the present invention.

Therefore, it should be understood that the exemplary embodiments described above are not restrictive, but are exemplary in all aspects. It should be interpreted that the scope of the present disclosure is defined by the following claims rather than the above-mentioned detailed description and all modifications or alterations deduced from the meaning, the scope, and equivalences of the claims are included in the scope of the present disclosure.

What is claimed is:

1. A method for reducing noise generated from an electric oil pump (EOP) while driving a vehicle in which the EOP is mounted without a mechanical oil pump (MOP), wherein
   revolutions per minute (RPM) of the EOP, controlled by a controller, is 70% or less of a maximum RPM during a low noise driving mode, and
   the EOP, controlled by the controller, rotates at the maximum RPM during a high noise driving mode,
   wherein the low noise driving mode and the high noise driving mode are determined by:
      determining whether or not a transmission of the vehicle shifts; and
      determining at least one of whether or not an oil temperature is a reference temperature or more, whether or not a throttle opening value is a reference opening value or more, or whether or not a torque input to a transmission is a reference torque or more.

2. The method of claim 1, wherein the method includes determining the low noise driving mode when the oil temperature is a reference temperature or less.

3. The method of claim 1, wherein the method includes determining the low noise driving mode when the throttle opening value is a reference opening value or less.

4. The method of claim 1, wherein the method includes determining the low noise driving mode when the torque input to the transmission is a reference torque or less.

5. The method of claim 1, wherein the method includes determining the high noise driving mode when the transmission of the vehicle shifts.

6. The method of claim 1, wherein the method further includes:
   determining the high noise driving mode when the transmission of the vehicle shifts while the oil temperature, the throttle opening value, and the torque input to the transmission are the reference temperature value or more, the reference opening value or more, and the reference torque or more, respectively.

7. The method of claim 1, wherein only the EOP is mounted in the vehicle.

* * * * *